United States Patent
Cunha et al.

(10) Patent No.: US 10,378,773 B2
(45) Date of Patent: Aug. 13, 2019

(54) TURBINE ENGINE DIFFUSER ASSEMBLY WITH AIRFLOW MIXER

(71) Applicant: United Technologies Corporation, Hartford, CT (US)

(72) Inventors: Frank J. Cunha, Avon, CT (US); Stanislav Kostka, Shrewsbury, MA (US)

(73) Assignee: United Technologies Corporation, Farmington, CT (US)

( * ) Notice: Subject to any disclaimer, the term of this patent is extended or adjusted under 35 U.S.C. 154(b) by 1072 days.

(21) Appl. No.: 14/853,368

(22) Filed: Sep. 14, 2015

(65) Prior Publication Data

US 2016/0084502 A1 Mar. 24, 2016

Related U.S. Application Data

(60) Provisional application No. 62/052,825, filed on Sep. 19, 2014.

(51) Int. Cl.
| | |
|---|---|
| F23R 3/04 | (2006.01) |
| F04D 29/44 | (2006.01) |
| F01D 9/02 | (2006.01) |
| F01D 9/06 | (2006.01) |
| F02C 6/06 | (2006.01) |
| F23R 3/02 | (2006.01) |
| F02C 7/04 | (2006.01) |

(Continued)

(52) U.S. Cl.
CPC ............... *F23R 3/04* (2013.01); *F01D 9/02* (2013.01); *F01D 9/065* (2013.01); *F02C 6/06* (2013.01); *F02C 7/04* (2013.01); *F02C 9/16* (2013.01); *F23R 3/005* (2013.01); *F23R 3/02* (2013.01); *F04D 29/44* (2013.01); *F05D 2210/12* (2013.01); *F05D 2210/13* (2013.01); *F05D 2220/30* (2013.01); *F05D 2240/35* (2013.01)

(58) Field of Classification Search
CPC .. F04D 29/44; F23R 3/04; F23R 3/045; F02C 9/16; F02C 9/18; F02C 7/185; F02C 6/08
USPC .......................................................... 60/751
See application file for complete search history.

(56) References Cited

U.S. PATENT DOCUMENTS

| 4,120,150 A | * | 10/1978 | Wakeman ............... F02C 7/185 60/39.091 |
| 4,380,895 A | | 4/1983 | Adkins |

(Continued)

FOREIGN PATENT DOCUMENTS

| FR | 2706533 A1 * | 12/1994 | ............. F01D 9/065 |
| WO | 2014071120 | 5/2014 | |

OTHER PUBLICATIONS

English translation of FR 2706533 A1.*
EP Search Report dated Feb. 10, 2016.

*Primary Examiner* — William H Rodriguez
*Assistant Examiner* — Thomas Burke
(74) *Attorney, Agent, or Firm* — O'Shea Getz P.C.

(57) ABSTRACT

A diffuser assembly is provided for a turbine engine. This diffuser assembly includes a diffuser module with a combustor plenum and a mixing chamber. The diffuser module is configured to receive first and second airflows into the mixing chamber and direct a mixed airflow out of the mixing chamber. The diffuser module includes a mixer configured to mix the first and the second airflows together within the mixing chamber to provide the mixed airflow.

14 Claims, 7 Drawing Sheets

(51) Int. Cl.
*F02C 9/16* (2006.01)
*F23R 3/00* (2006.01)

(56) References Cited

U.S. PATENT DOCUMENTS

| | | | |
|---|---|---|---|
| 5,335,501 A * | 8/1994 | Taylor | F23R 3/04 |
| | | | 60/747 |
| 5,406,799 A | 4/1995 | Marshall | |
| 5,490,380 A | 2/1996 | Marshall | |
| 5,632,141 A | 5/1997 | Sloop et al. | |
| 7,093,441 B2 | 8/2006 | Burd et al. | |
| 7,874,158 B2 | 1/2011 | O'Neill et al. | |
| 8,162,605 B2 | 4/2012 | Alvanos et al. | |
| 8,800,290 B2 | 8/2014 | Burd et al. | |
| 2007/0068165 A1 * | 3/2007 | Tiemann | F01D 25/12 |
| | | | 60/751 |
| 2014/0178174 A1 | 6/2014 | Caprario et al. | |
| 2014/0182304 A1 * | 7/2014 | Antoniono | F23R 3/04 |
| | | | 60/783 |
| 2015/0252729 A1 | 9/2015 | Niggemeier et al. | |

* cited by examiner

TURBINE ENGINE DIFFUSER ASSEMBLY WITH AIRFLOW MIXER

This application claims priority to U.S. Patent Appln. No. 62/052,825 filed Sep. 19, 2014.

BACKGROUND OF THE INVENTION

1. Technical Field

This disclosure relates generally to a turbine engine and, more particularly, to a diffuser assembly for a turbine engine.

2. Background Information

A typical turbine engine includes a combustor between a compressor and a turbine. The combustor may be arranged within a diffuser module, which functions in general as an air distribution intermediary between the compressor and the combustor. In some engines, some of the compressed air within the diffuser module may be diverted for cooling other components of the turbine engine. Various arrangements are known in the art for diverting this air; however, each, of these arrangements has its own disadvantageous associated therewith.

There is a need in the art for an improved diffuser assembly for a turbine engine.

SUMMARY OF THE DISCLOSURE

According to an aspect of the invention, a diffuser assembly is provided for a turbine engine. This diffuser assembly includes a diffuser module with a combustor plenum and a mixing chamber. The diffuser module is configured to receive first and second airflows into the mixing chamber and direct a mixed airflow out of the mixing chamber. The diffuser module includes a mixer configured to mix the first and the second airflows together within the mixing chamber to provide the mixed airflow.

According to another aspect of the invention, an assembly is provided for a turbine engine. This turbine engine assembly includes a diffuser module with an inlet passage, a mixing chamber and first and second inlets leading into the mixing chamber. The diffuser module includes a hollow strut and a mixer. The hollow strut extends across the inlet passage and is fluidly coupled with the mixing chamber. The mixer is configured to provide a flow obstruction between the first inlet and the hollow strut.

According to still another aspect of the invention, a method is provided involving a diffuser module of a turbine engine. This method includes receiving first and second airflows in a mixing chamber of the diffuser module. The first and the second airflows are mixed together within the mixing chamber using a mixer to provide a mixed airflow, which is provided to another component of the turbine engine.

The first airflow may be a conditioned airflow. In addition or alternatively, the second airflow may have a higher pressure than the first airflow. In addition or alternatively, the second airflow may also be conditioned.

A combustor may be included within a combustor plenum of the diffuser module. The inlet passage may lead to the combustor plenum.

A hollow strut may be included that extends across an inlet passage of the diffuser module which inlet passage leads to the combustor plenum. The hollow strut may be configured to receive at least a portion of the mixed airflow from the mixing chamber.

An inlet may he included through which at least a portion of the first airflow is directed into the mixing chamber. The inlet may be substantially circumferentially aligned (or offset) with the hollow strut.

An inlet may be included through which at least a portion of the first airflow is directed into the mixing chamber. The mixer may be configured to obstruct a direct path between the inlet and the hollow strut.

The mixer may be configured to diffuse the first airflow into the mixing chamber.

An inlet may be included through which at least a portion of the first airflow is directed into the mixing chamber. The mixer may include or be configured as a mixing device located at the inlet.

The mixing device may be mated with the inlet.

The mixer may include or be configured as a mixing device with a cupped body and a plurality of perforations through the body.

Each of the perforations may have a substantially uniform configuration; e.g., size, shape, etc. Alternatively, one of the perforations may have a different configuration than another one of the perforations.

The mixer may include or be configured as a plurality of discrete mixing devices. These mixing devices are configured to cumulatively mix the first and the second airflows together within the mixing chamber to provide the mixed airflow.

Each of the mixing devices may have a substantially uniform configuration. Alternatively, one of the mixing devices may have a different configuration than another one of the mixing devices.

A heat exchanger may be included and configured to provide the first airflow.

The heat exchanger may be fluidly coupled between the combustor plenum and the mixing chamber.

The diffuser module may be configured to direct the second airflow from the combustor plenum into the mixing chamber; e.g., without passing through a heat exchanger.

The foregoing features and the operation of the invention will become more apparent in light of the following description and the accompanying drawings.

DETAILED DESCRIPTION OF THE INVENTION

Figure 1:
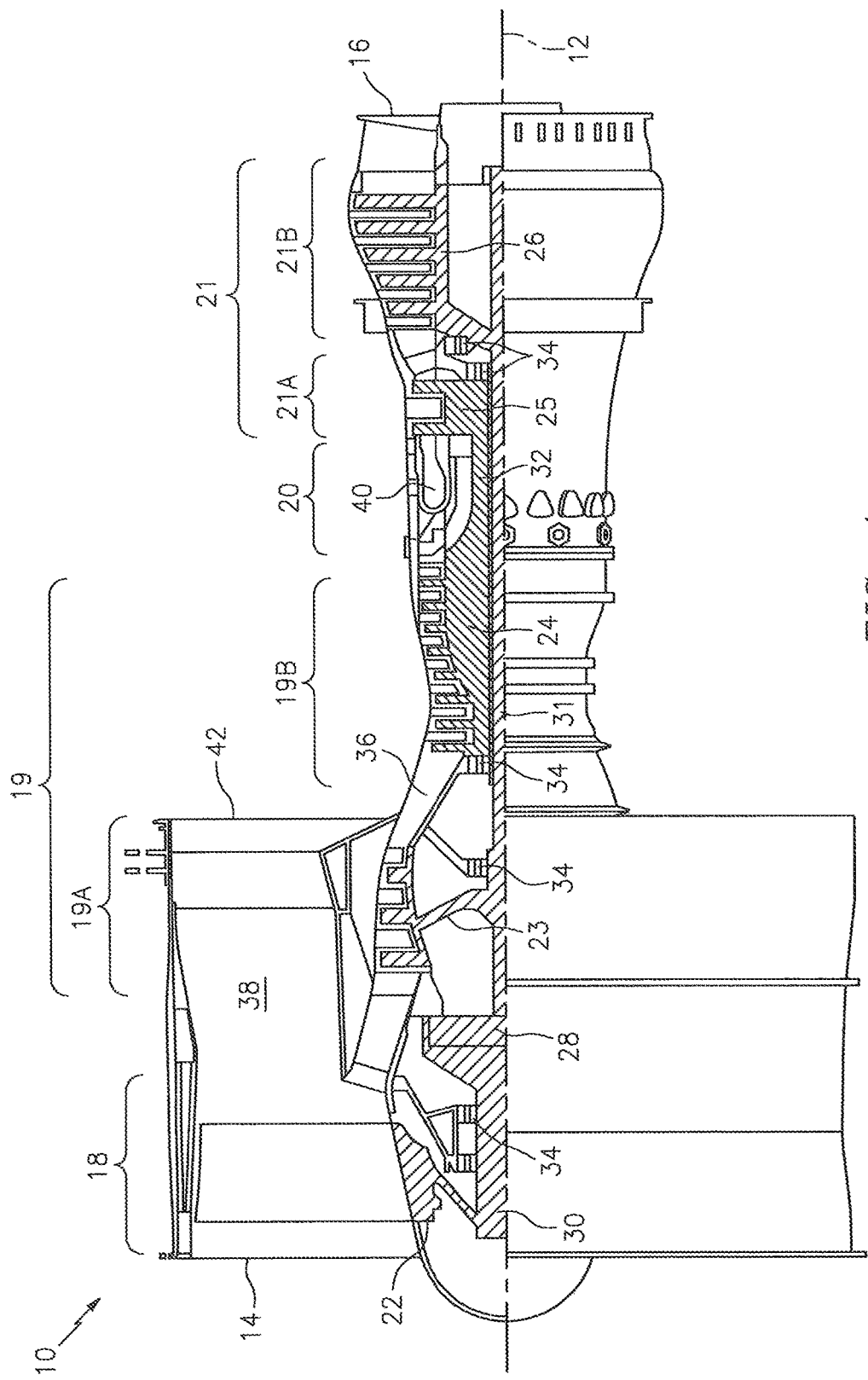
FIG. 1 is a side cutaway illustration of a geared turbine engine.

FIG. 1 is a side cutaway illustration of a geared turbine engine 10, which is configured as a turbofan engine. The turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing. Each of the engine sections 18, 19A, 19B, 21A and 21B includes a respective rotor 22-26. Each of these rotors 22-26 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 22 is connected to a gear train 28, for example, through a fan shaft 30. The gear train 28 and the LPC rotor 23 are connected to and driven by the LPT rotor 26 through a low speed shaft 31. The HPC rotor 24 is connected to and driven by the HPT rotor 25 through a high speed shaft 32. The shafts 30-32 are rotatably supported by a plurality of bearings 34; e.g., rolling element bearings and/or thrust bearings. Each of these bearings 34 is connected to the engine housing by at least one stationary structure such as, for example, an annular support strut.

During operation, air enters the turbine engine 10 through the airflow inlet 14, and is directed through the fan section 18 and into a core gas path 36 and the bypass gas path 38. The air within the core gas path 36 may be referred to as "core air". The air within the bypass gas path 38 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 40 and mixed with the core air. This fuel-core air mixture is ignited to power the turbine section 21. The bypass air is directed through the bypass gas path 38 and out of the turbine engine 10 through a bypass nozzle 42 to provide additional forward engine thrust. Alternatively, at least some of the bypass air may be directed out of the turbine engine 10 through a thrust reverser to provide reverse engine thrust.

Figure 2:
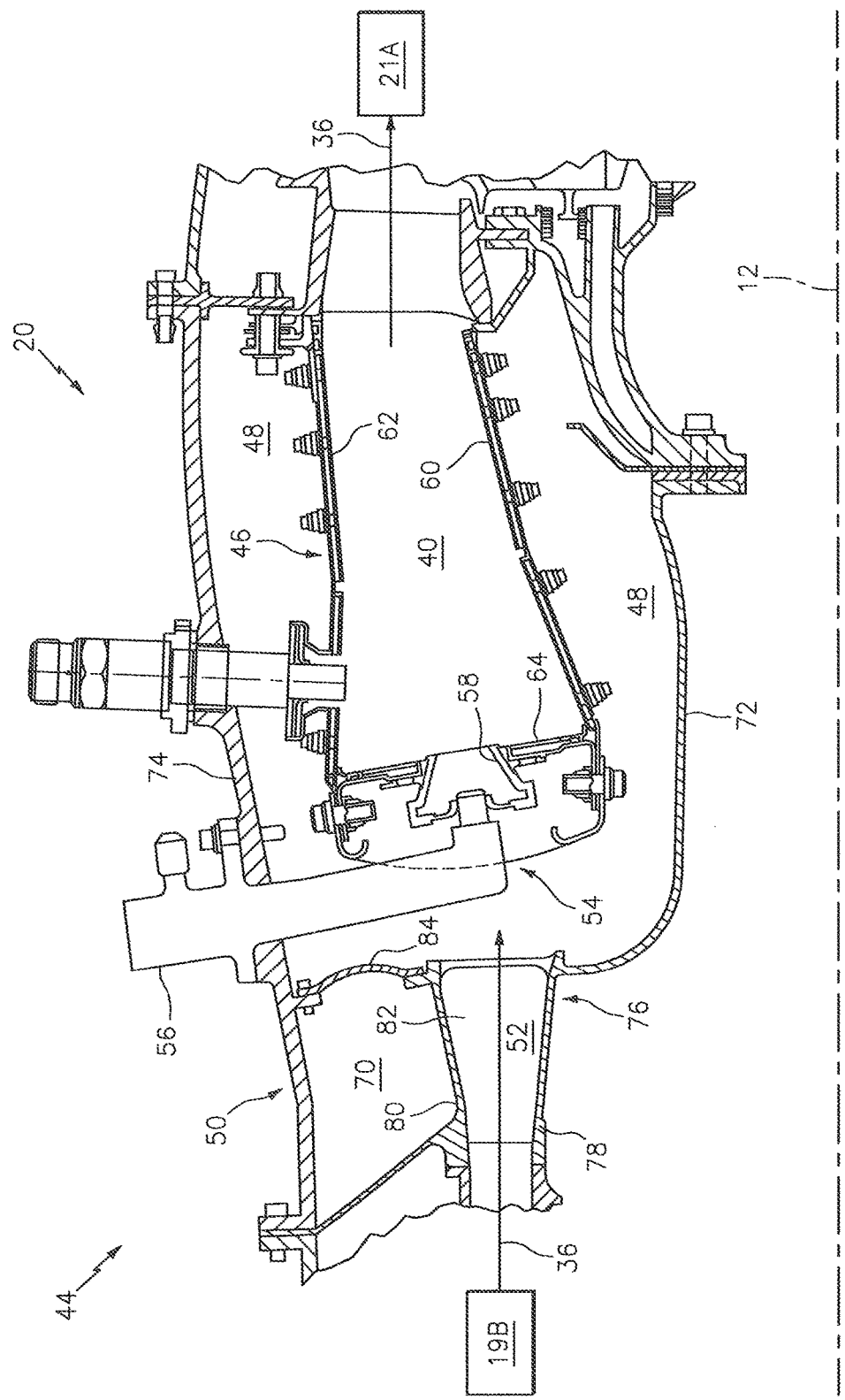
FIG. 2 is a sectional illustration of an assembly for the turbine engine.

FIG. 2 illustrates an assembly 44 of the turbine engine 10. This turbine engine assembly 44 includes a combustor 46 arranged within a combustor plenum 48 of a diffuser module 50. This combustor plenum 48 receives compressed core air from the HPC section 19B through an inlet passage 52 of the diffuser module 50. The combustor plenum 48 provides the received core air to the combustor 46 as well as to other components as described below in further detail.

The turbine engine assembly 44 also includes one or more fuel injector assemblies 54 arranged circumferentially around the centerline 12. Each of these fuel injector assemblies 54 includes a fuel injector 56 which may be mated with a swirler 58. The fuel injector 56 injects the fuel into the combustion chamber 40. The swirler 58 directs some of the core air from the combustor plenum 48 into the combustion chamber 40 in a manner that facilitates mixing the core air with the injected fuel. Quench apertures (not shown) in inner and/or outer walls 60 and 62 of the combustor 46 may direct additional core air into the combustion chamber 40 for combustion. Additional core air may also or alternatively be directed (e.g., effused) into the combustion chamber 40 through cooling apertures (not shown) in the inner and the outer walls 60 and 62.

The combustor 46 may be configured as an annular floating wall combustor. The combustor 46 of FIG. 2, for example, includes an annular combustor bulkhead 64, the tubular combustor inner wall 60, and the tubular combustor outer wall 62. The bulkhead 64 extends radially between and is connected to the inner wall 60 and the outer wall 62. Each wall 60. 62 extends axially along the centerline 12 from the bulkhead 64 towards the HPT section 21A, thereby defining the combustion chamber 40. Each combustor component 60, 62, 64 may be a multi-walled structure that includes, for example, a heat shield attached to a shell. One or more of these components 60, 62, 64, however, may alternatively each be a single walled structure; e.g., comprise a single liner.

Figure 3:
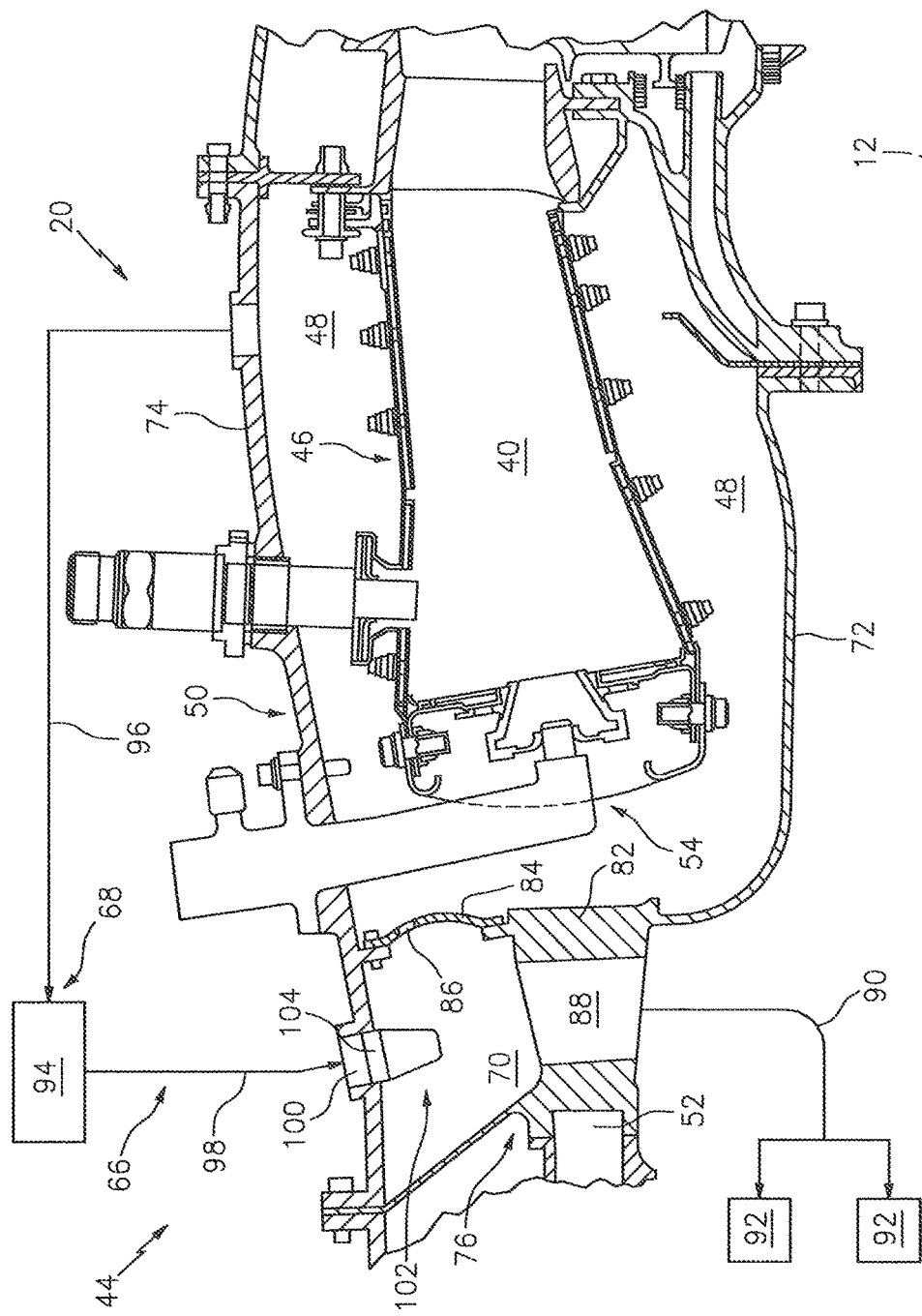
FIG. 3 is a sectional illustration of the turbine engine assembly configured with a diffuser assembly, part of which is schematically illustrated.

FIG. 3 illustrates a diffuser assembly 66 configured with the turbine engine assembly 44. This diffuser assembly 66 includes the diffuser module 50 configured with an airflow conditioning system 68.

The diffuser module 50 may include one or a plurality of various turbine engine components. Examples of such turbine engine components include, but not limited to, cases, shrouds, struts, vanes, seals, ducts, etc. The diffuser module 50 and its various components may be configured as an annular body that extends along the centerline 12 to and/or about the combustor 46.

Figure 4:
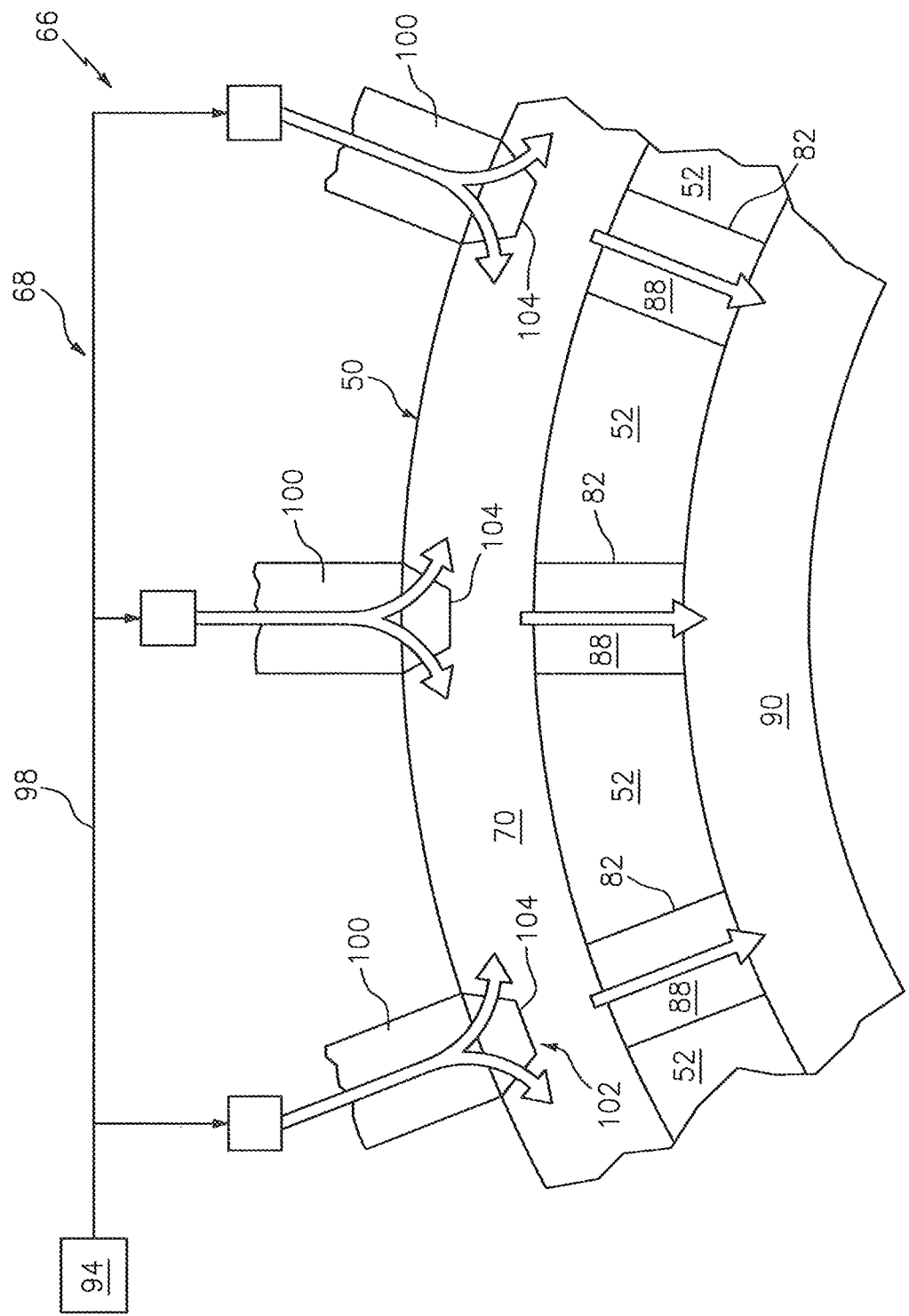
FIG. 4 is a schematic cross-sectional illustration of the diffuser assembly.

The diffuser module 50 forms the combustor plenum 48, the inlet passage 52 (see FIG. 2) and a mixing chamber 70. The combustor plenum 48 of FIG. 2, for example, is defined radially between an inner case 72 and an outer case 74. The inlet passage 52 is defined by a pre-diffuser assembly 76. More particularly, the inlet passage 52 is defined radially between inner and outer shrouds 78 and 80 of the pre-diffuser assembly 76. The pre-diffuser assembly 76 also includes one or more hollow struts 82 (e.g., hollow structural guide vanes), which extend radially across and circumferentially subdivide at least a portion of the inlet passage 52 as illustrated in FIG. 4. Referring to FIG. 3, the mixing chamber 70 is defined radially between the pre-diffuser assembly 76 and the outer case 74. The mixing chamber 70 and the combustor plenum 48 are generally fluidly separated by at least one annular wall 84 (e.g., a seal), which extends between the outer case 74 and the outer shroud 80 (see FIG. 2). The wall 84 of FIG. 3, however, may include one or more axially extending orifices 86 which provide a leakage flow-path between the combustor plenum 48 and the mixing chamber 70; e.g., an inlet into the mixing chamber 70. Alternatively, the wall 84 may include a plurality of arcuate sections and one or more circumferential gaps between these sections may be configured to provide the leakage flowpath. Still alternatively, the wall 84 may be omitted, for example, where an annular lip is arranged between the combustor plenum 48 and the mixing chamber 70.

Each of the hollow struts 82 forms an inner bore 88 (e.g., outlet passage) that fluidly couples the mixing chamber 70 with at least one flowpath 90 and/or manifold. This flowpath 90 and/or manifold fluidly couples the inner bores 88 with one or more other components 92 of the turbine engine 10; e.g., one or more of the rotor 22-26 components.

The airflow conditioning system 68 may include a heat exchanger 94. This heat exchanger 94 may include one or more heat exchanger units connected serially and/or in parallel. An inlet of the heat exchanger 94 is fluidly coupled with the combustor plenum 48 through a flowpath 96 (e.g., a duct or hose) and/or manifold. An outlet of the heat exchanger 94 is fluidly coupled with the mixing chamber 70 through a flowpath 98 (e.g., a duct or hose) and/or manifold. The heat exchanger 94 is configured to cool (or heat) or otherwise condition an airflow received from the combustor plenum 48 and provide the conditioned airflow to the mixing chamber 70.

Figure 5:
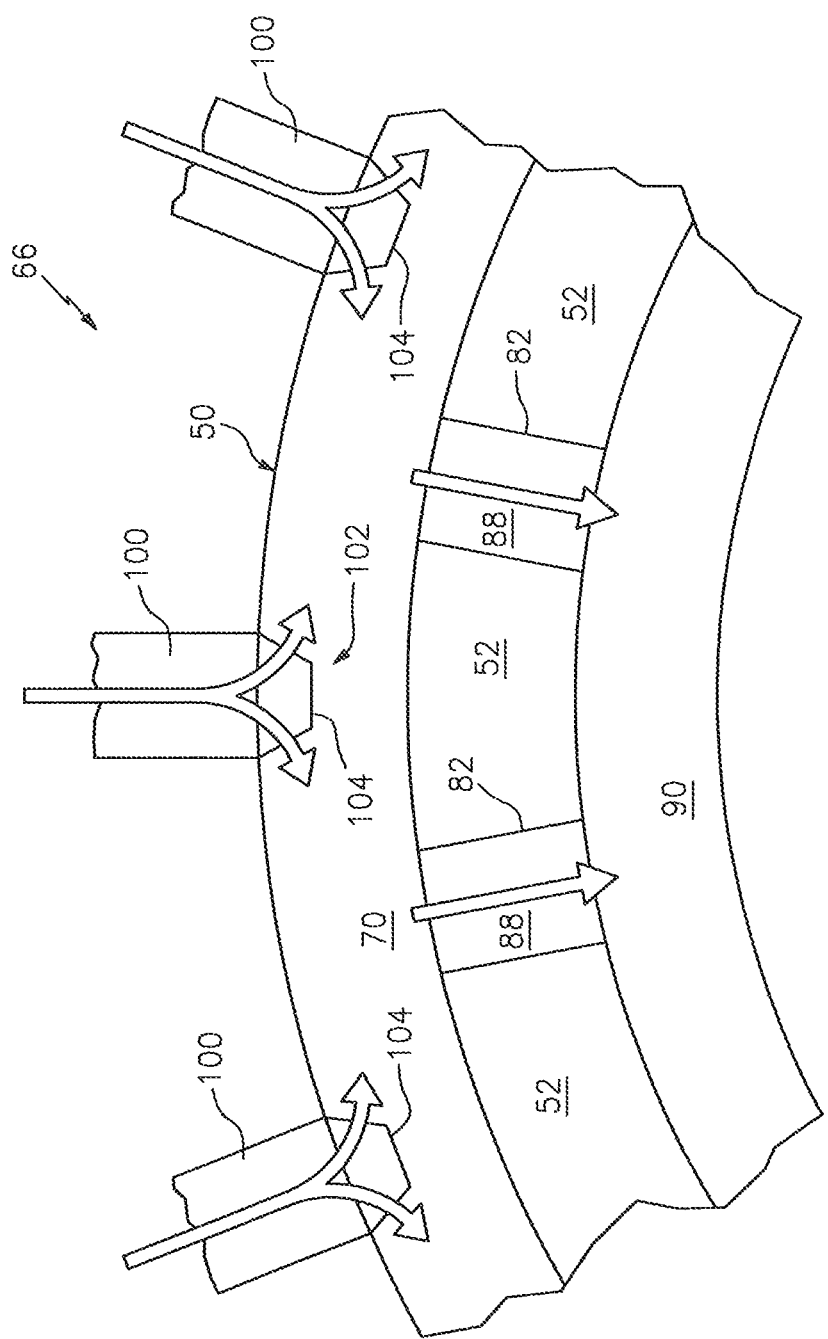
FIG. 5 is a schematic cross-sectional illustration of an alternate embodiment diffuser assembly.

The flowpath 98 is fluidly coupled with the mixing chamber 70 through one or more inlets 100. Referring to FIGS. 3 and 4, each of these inlets 100 may be substantially aligned, circumferentially and/or axially, with a respective one of the inner bores 88 and/or a respective one of the inlets 86. Alternatively, one or more of the inlets 100 may be offset, circumferentially and/or axially, from the inner bores 88 and/or the inlets 86. For example, referring to FIG. 5, each of the inlets 100 may be positioned circumferentially between a respective adjacent pair of the inner bores 88. It is worth noting, while the drawings illustrate the same number of inlets 100 as inlets 86 and struts 82, the present disclosure is not limited to such correspondence. For example, there could be one inlet 100 for every two, three, etc. struts 82, or vice versa.

Referring again to FIGS. 3 and 4, the diffuser module 50 further includes a mixer 102. This mixer 102 is configured to mix airflows entering the mixing chamber 70 from the inlets 86 and 100 together to provide a mixed airflow. The mixer 102, for example, may be arranged to obstruct a direct path between one or more of the inlets 100 and each corresponding inner bore 88. Air entering the mixing chamber 70 through the respective inlets 100 therefore must move circumferentially and/or axially within the mixing chamber 70, which movement promotes mixing with other an within the mixing chamber 70; e.g., air entering through the inlets 86. The mixer 102 may also or alternatively be configured to diffuse air entering the mixing chamber 70 through the respective inlets 100, which again promotes mixing of the diffused air with other air within the mixing chamber 70.

The mixer 102 may include one or more discrete mixing elements 104. Each of these mixing elements 104 may be aligned between a respective one of the inlets 100 and a respective one of the inner bores 88. Each mixing element 104, for example, may be located at (e.g., on, in, adjacent or proximate) and mated with a respective one of the inlets 100.

Figure 6:
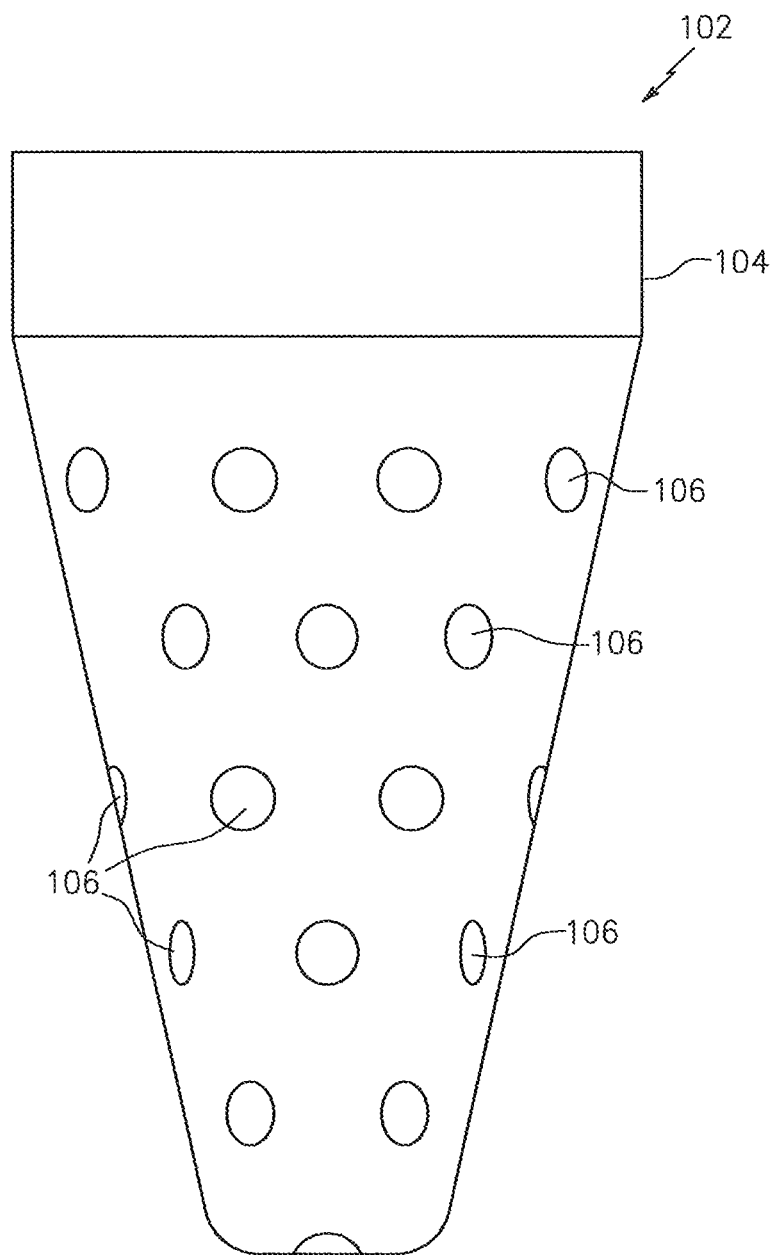
FIG. 6 is a side illustration of a mixing element.

Referring to FIG. 6, each mixing element 104 may be configured with a perforated cupped body (e.g., as a sieve). The geometry of the cupped body paired with the placement of the perforations 106 may be tailored to redirect certain portions of incoming air in various directions. In this manner, the mixing element 104 may divert the path of the incoming air away from the inner bores 88 as well as diffuse the incoming air to further promote mixing. The perforations 106 through the cupped body may have a substantially uniform configuration; e.g., the same shape and size. Alternatively, one or a set of the perforations 106 may have a different configuration (e.g., shape and/or size) than another one or set of the perforations 106. Similarly, the mixing elements 104 may have a substantially uniform configuration. Alternatively, one or a set of the mixing elements 104 may have a different configuration than another one or set of the mixing element 104. Furthermore, in other embodiments, the mixing elements 104 may only be configured with a subset of the inlets 100. In some embodiments, one or more of the mixing elements 100 may also or alternatively be configured with one or more of the respective inlets 86.

Referring to FIGS. 3 and 4, during operation, compressed core air flows from the combustor plenum 48 into the heat exchanger 94 through the flowpath 96. The heat exchanger 94 cools (or heats) and/or otherwise conditions the received core air. The conditioned core air flows through the flowpath 98 and then the one or more inlets 100 and into the mixing chamber 70 as a conditioned airflow.

Pressure of the conditioned airflow is typically less than that of the compressed core air within the combustor plenum 48 due to a pressure drop across the heat exchanger 94 or another supply plenum. Therefore, to increase air pressure within the mixing chamber 70 and ensure proper airflow to the turbine engine components 92, some compressed core air is allowed to flow substantially directly from the combustor plenum 48 into the mixing chamber 70 through the one or more inlets 86 as a boost (e.g., high pressure) airflow. Temperature of this boost airflow, however, is typically much higher than that of the conditioned airflow. The mixer 102 therefore is provided to promote thorough mixing of the airflows together to provide a mixed airflow with a relatively even, but low temperature.

Figure 7:
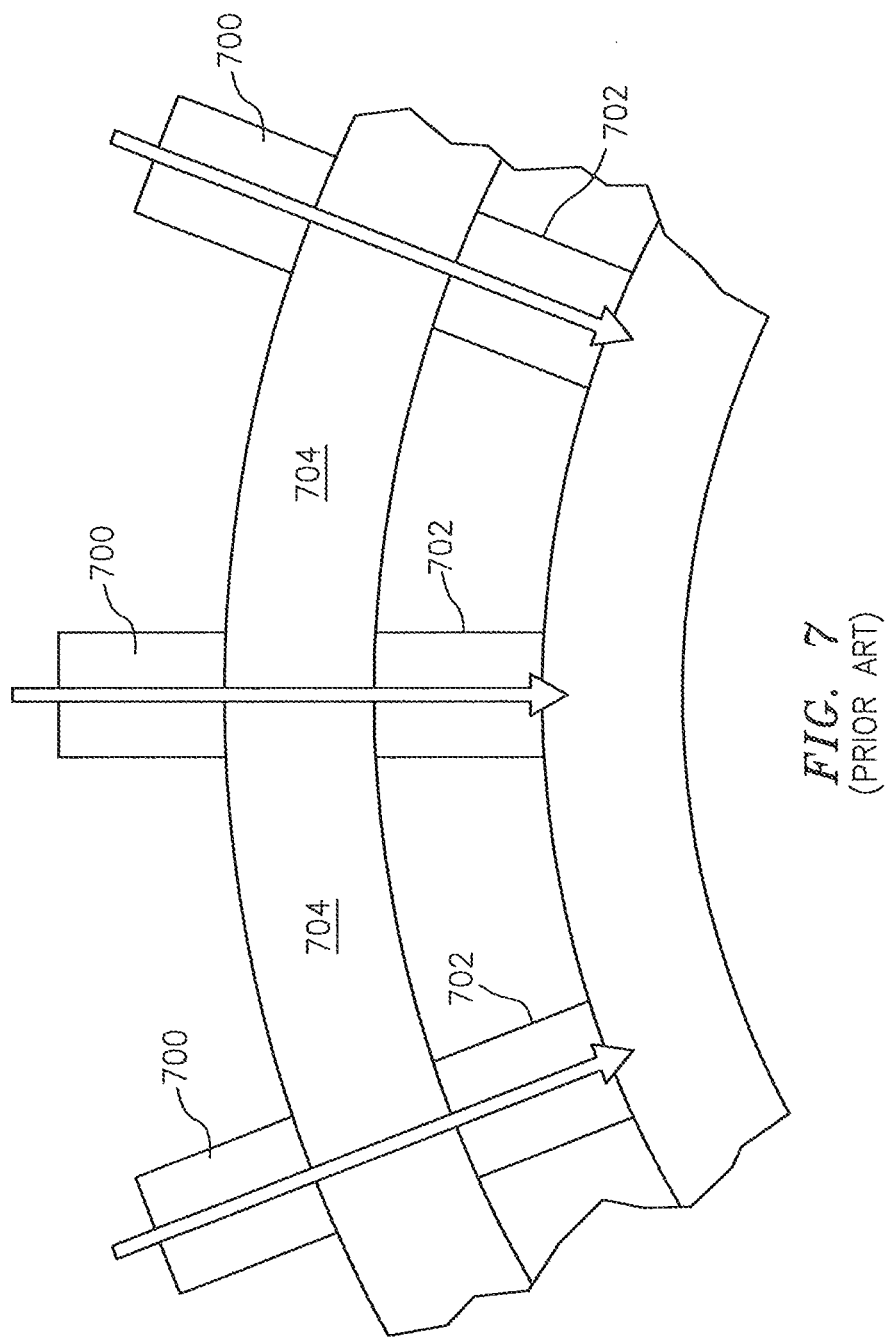
FIG. 7 is a schematic cross-sectional illustration of a prior art diffuser assembly.

It is worth noting, without provision of the mixer 102, the conditioned airflow may have the tendency to flow directly from inlets 700 into hollow struts 702 without much if at any mixing within chamber 704 as illustrated in FIG. 7. This can lead to relatively high temperature differentials within the chamber 704 as well as across components (e.g., struts 702) of the diffuser, which can lead to relatively high thermal stresses and premature component failure.

The terms "upstream", "downstream", "inner" and "outer" are used to orientate the components of the systems described above relative to the turbine engine 10 and its centerline 12. A person of skill in the art will recognize, however, one or more of these components may be utilized in other orientations than those described above. The present invention therefore is not limited to any particular spatial orientations.

The systems may be included in various turbine engines other than the one described above. The systems, for example, may be included in a geared turbine engine where a gear train connects one or more shafts to one or more rotors in a fan section, a compressor section and/or any other engine section. Alternatively, the systems may be included in a turbine engine configured without a gear train. The systems may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A diffuser assembly for a turbine engine, the assembly comprising:
    a diffuser module with a combustor plenum and a mixing chamber;
    the diffuser module configured to receive a first airflow and a second airflow into the mixing chamber and direct a mixed airflow out of the mixing chamber;
    the diffuser module including a mixer configured to mix the first airflow and the second airflow together within the mixing chamber to provide the mixed airflow;

an inlet through which at least a portion of the first airflow is directed into the mixing chamber;

the mixing chamber comprising a mixing device located at the inlet, and the mixer configured to diffuse the first airflow into the mixing chamber; and wherein the mixing device is configured with a cupped body and a plurality of perforations through the cupped body.

2. The diffuser assembly of claim 1, further comprising a hollow strut extending across an inlet passage of the diffuser module which inlet passage leads to the combustor plenum, wherein the hollow strut is configured to receive at least a portion of the mixed airflow from the mixing chamber.

3. The diffuser assembly of claim 2, wherein the mixer is configured to obstruct a direct path between the inlet and the hollow strut.

4. The diffuser assembly of claim 2, wherein the inlet is substantially circumferentially aligned with the hollow strut.

5. The diffuser assembly of claim 1, wherein the mixing device is mated with the inlet.

6. The diffuser assembly of claim 1, wherein each of the perforations has a substantially uniform configuration.

7. The diffuser assembly of claim 1, wherein the mixer comprises a plurality of discrete mixing devices configured to cumulatively mix the first airflow and the second airflow together within the mixing chamber to provide the mixed airflow.

8. The diffuser assembly of claim 7, wherein each of the mixing devices has a substantially uniform configuration.

9. The diffuser assembly of claim 1, further comprising a heat exchanger configured to provide the first airflow.

10. The diffuser assembly of claim 9, wherein the heat exchanger is fluidly coupled between the combustor plenum and the mixing chamber.

11. The diffuser assembly of claim 1, wherein the diffuser module is configured to direct the second airflow from the combustor plenum into the mixing chamber.

12. An assembly for a turbine engine, the assembly comprising:

a diffuser module with an inlet passage, a mixing chamber and a first inlet and a second inlet leading into the mixing chamber, the diffuser module including a hollow strut and a mixer;

the hollow strut extending across the inlet passage and fluidly coupled with the mixing chamber;

the mixer configured to provide a flow obstruction between the first inlet and the hollow strut, wherein the mixer comprises a mixing device located at the second inlet; and wherein the mixing device is configured with a cupped body and a plurality of perforations through the cupped body.

13. The assembly of claim 12, further comprising a combustor within a combustor plenum of the diffuser module, wherein the inlet passage leads to the combustor plenum.

14. A method involving a diffuser module of a turbine engine, the method comprising:

receiving a first airflow and a second airflow in a mixing chamber of the diffuser module;

mixing the first airflow and the second airflow together within the mixing chamber using a mixer to provide a mixed airflow;

providing the mixed airflow to another component of the turbine engine;

wherein the first airflow is a conditioned airflow and the second airflow has a higher pressure than the first airflow;

wherein the mixer comprises a mixing device and is discrete from a fuel injector assembly for the turbine engine; and wherein the mixing device is configured with a cupped body and a plurality of perforations through the cupped body.

* * * * *